No. 750,819. PATENTED FEB. 2, 1904.
H. H. CUMMINGS.
COIN CONTROLLED APPARATUS.
APPLICATION FILED NOV. 27, 1899.
NO MODEL. 6 SHEETS—SHEET 1.

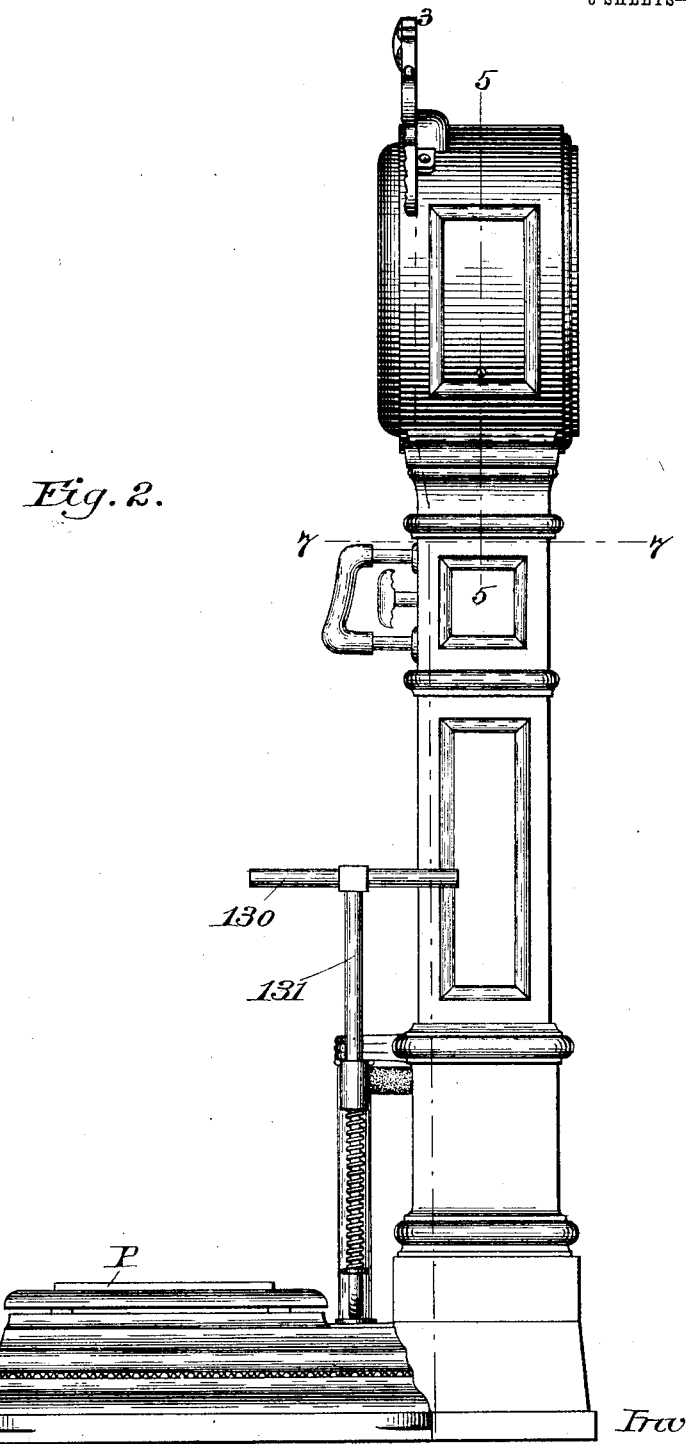

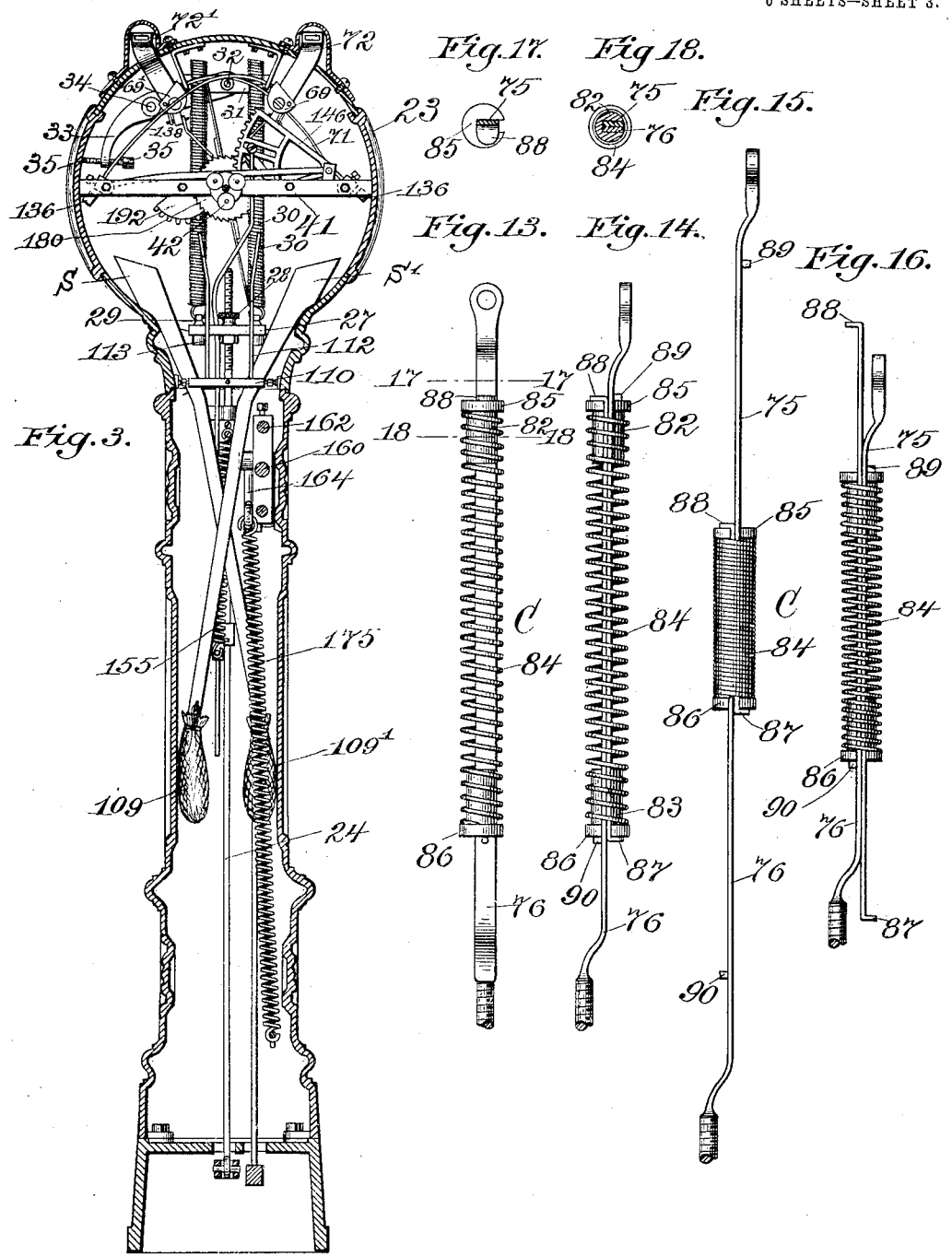

No. 750,819. PATENTED FEB. 2, 1904.
H. H. CUMMINGS.
COIN CONTROLLED APPARATUS.
APPLICATION FILED NOV. 27, 1899.
NO MODEL. 6 SHEETS—SHEET 4.
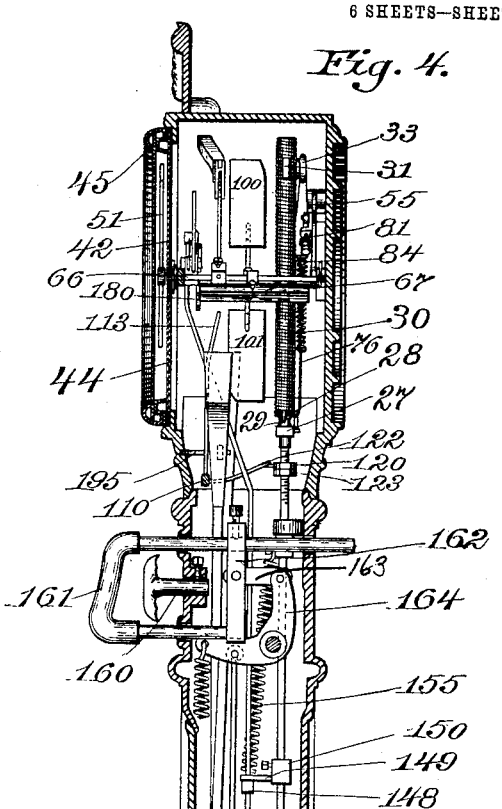
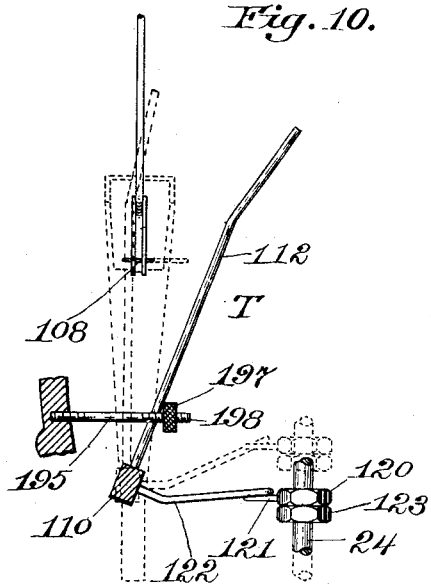
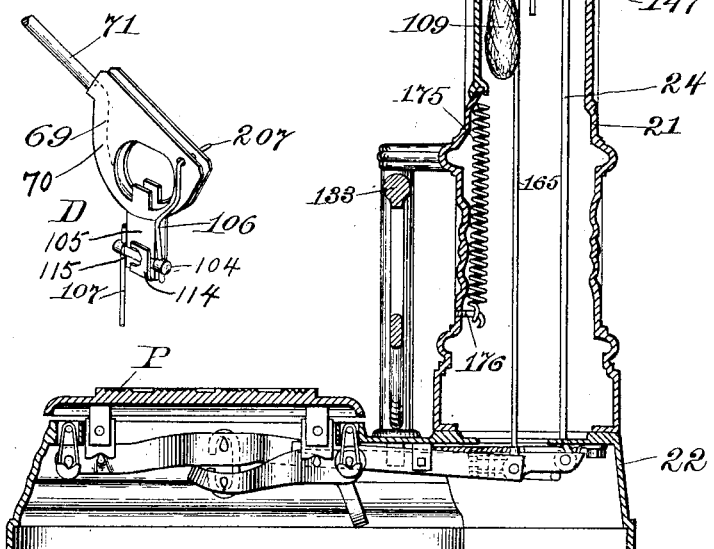
Witnesses:
Frank G. Hattie.
Adolf C. Kaiser.
Inventor:
Henry H. Cummings,
by Crosby Gregory
Attys.

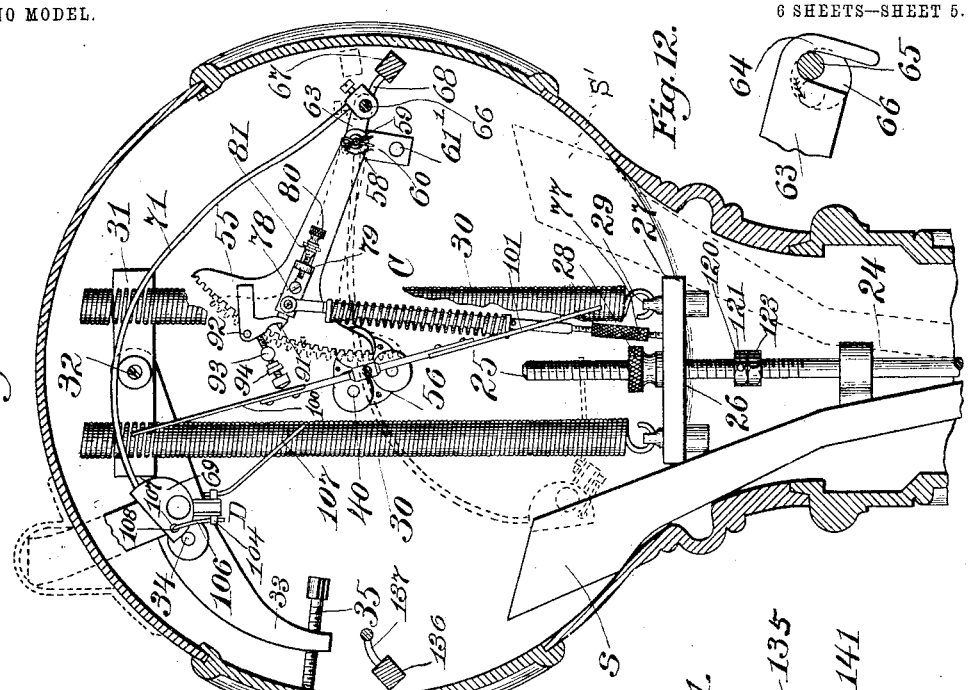

No. 750,819. PATENTED FEB. 2, 1904.
H. H. CUMMINGS.
COIN CONTROLLED APPARATUS.
APPLICATION FILED NOV. 27, 1899.
NO MODEL. 6 SHEETS—SHEET 6.

Witnesses:
Frank G. Hattie.
Adolf C. Kaiser.

Inventor:
Henry H. Cummings.
by Crosby & Gregory
Attys.

No. 750,819. Patented February 2, 1904.

UNITED STATES PATENT OFFICE.

HENRY H. CUMMINGS, OF MALDEN, MASSACHUSETTS.

COIN-CONTROLLED APPARATUS.

SPECIFICATION forming part of Letters Patent No. 750,819, dated February 2, 1904.

Application filed November 27, 1899. Serial No. 738,295. (No model.)

*To all whom it may concern:*

Be it known that I, HENRY H. CUMMINGS, a citizen of the United States, and a resident of Malden, county of Middlesex, and State of Massachusetts, have invented an Improvement in Coin-Controlled Apparatus, of which the following description, in connection with the accompanying drawings, is a specification, like characters on the drawings representing like parts.

This invention relates to a coin-controlled apparatus, and it includes certain fundamental features shown in the accompanying drawings and set forth in detail in the following description in simple and convenient embodiments thereof.

Figure 1:
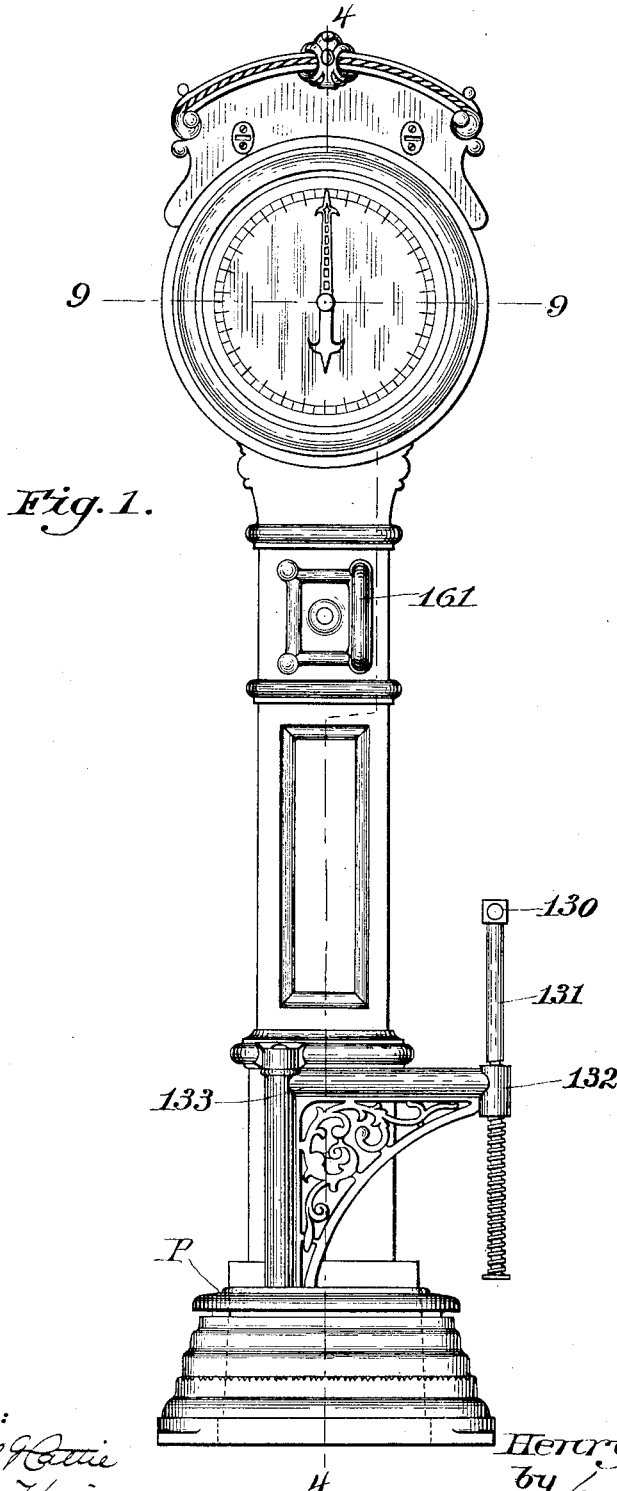
Figure 7:
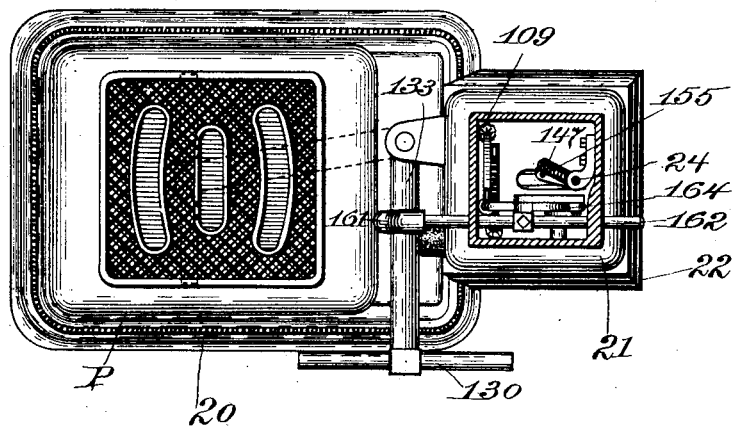
Figure 8:
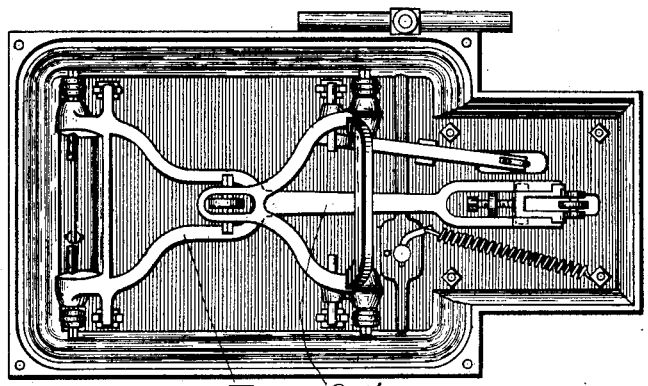
Figure 9:
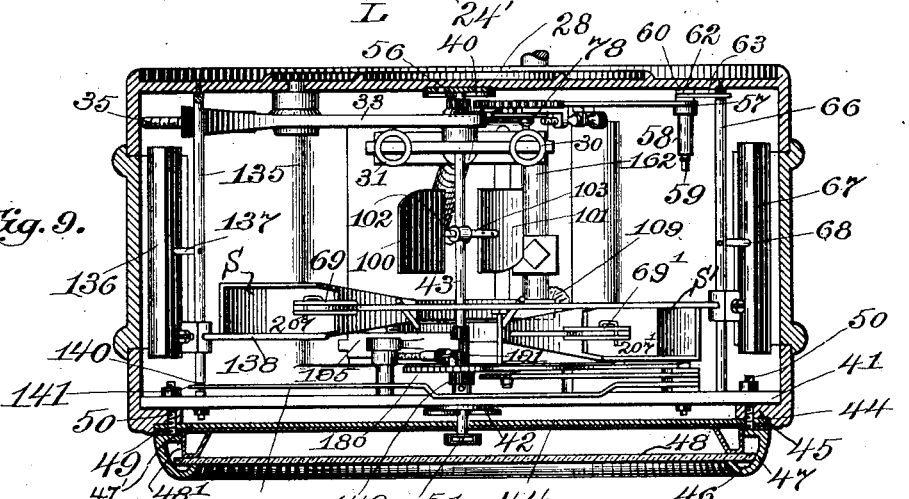

In the drawings, Figure 1 is a front elevation of the apparatus. Fig. 2 is a side elevation of said apparatus. Fig. 3 is a vertical transverse section taken in the line 3 3, Fig. 2, and looking toward the right. Fig. 4 is a vertical longitudinal section taken in the line 4 4, Fig. 1, looking toward the left. Fig. 5 is a transverse section taken in the line 5 5, Fig. 2, and looking toward the left and showing the parts upon an enlarged scale. Fig. 6 is a view taken upon the same section-line, but looking toward the right, and certain of the parts appearing in Fig. 5 which are located to the left of said section-line 5 5. Fig. 7 is a sectional plan view, the section being taken in the line 7 7, Fig. 2. Fig. 8 is an under side view of the platform and beam-levers therein. Fig. 9 is a sectional plan view of the head, taken in the line 9 9, Fig. 1. Fig. 10 is a detail in elevation, showing a means for effecting the discharge of a coin. Figs. 11 and 12 are details showing a means for securing the working engagement between certain of the parts. Figs. 13 and 14 are two views of a yieldable connector hereinafter more fully described. Fig. 15 shows the yieldable connector when extended. Fig. 16 shows the yieldable connector in another position. Fig. 17 is a section on the line 17 17, Fig. 13; and Fig. 18 is a section on the line 18 18, Fig. 13. Fig. 19 is a detail in perspective of the coin-cup, coin-detent, and a part of the carrier.

In the drawings I have represented a coin-controlled apparatus for securing different kinds of tests, each in the present case by a different coin, and said mechanism will hereinafter be described as involving means for obtaining the weight, the lifting power, or grip of a person or persons.

In the drawings the case inclosing the working mechanism is shown including a base or bed 20, a column 21, sustained upon the offstanding portion 22 at the rear of the base or bed, and a head, as 23, all of these parts being hollow and communicating with each other and the base containing the beam-levers and the column and head housing the counterbalancing, indicator-operating, and other devices, which will be hereinafter described.

The system of levers sustained within the base 20 by the usual knife-edges is denoted in a general way by L and is substantially of the kind illustrated in Letters Patent No. 483,787, granted October 4, 1892, to G. G. Merry, the main lever 24' of the beam mechanism being jointed to the rod 24, connected with suitable counterbalance means which may be of the spring type.

The platform upon which a person stands to make one or the other of the tests, as hereinafter described, is denoted by P, and it is mounted by means of knife-edge bearings upon the system of beam-levers previously mentioned.

The rod 24, which connects the counterbalance and beam mechanisms, has its upper end threaded, as at 25, and such threaded portion extends through the slot or opening 26 in the cross-head 27 and is embraced by the nut 28, adapted to bear against the upper side of the cross-head 27. The cross-head has near its opposite ends lugs, as 29, having openings to receive the hooked ends of the counterbalancing-springs 30, arranged in parallelism and the upper ends of which are threaded or coiled through slots in the upper cross head or bar 31, which is pivoted at its middle, as at 32, to the rocking or tensioning lever 33, fulcrumed, as at 34, to the rear wall of the head.

An adjusting-screw 35 extends through the lower end of the lever 33, and its outer end bears against the side wall of the head, so that by turning said screw the end of the lever 33, to which the upper cross-head 31 is connected, can be raised or lowered to properly regulate the tension of the testing or counterbalancing springs 30, or the same effect can be obtained by turning the nut 28 to lower or raise the lower and what might be termed the "shiftable" cross-head 27.

My improved apparatus involves in the organization thereof represented testing and indicating mechanisms normally in inoperative relation and coin-controlled means for throwing one of them into operative relation with the other, so that a registration can be obtained of a test of whatever character it may be, either weighing, lifting, or gripping, or other kind, and the instrumentalities for performing these specified functions may be of any convenient character.

The back plate of the head 23 has near its center a series of triangularly-disposed rollers, as 40, of disk form, while the cross bar or bearing 41, secured suitably at the forward side of the head, has a similar series of rollers 42, and the opposite ends of the arbor or shaft 43 are sustained by these rollers, and the forward end of the arbor extends through the center of the dial 44, fitted in an annular recess in the inturned flange 45 upon the front of the head.

The dial represented bears on its face properly-graduated lines which serve to indicate by pounds the force expended in making the different tests.

The inner side of the rounded flange 46 of the ring 47 is engaged by the glass plate 48, which fits against the square face of the bead 48' on the ring 49, the parts being secured to the head of the machine by screw-bolts 50, extending through the cross-bar 41 and secured to the inturned flange 47' of the ring 47.

The pointer is denoted by 51, and its hub is rigidly secured in some convenient manner to the arbor or shaft 43, and it is preferably balanced, as is customary. The pointer is situated between the dial and the glass plate and is turned when operatively connected with the testing mechanism to indicate upon the dial the power outlaid in making any one of the three tests, the working end of the pointer stopping opposite a mark when a counterpoise is reached.

A sector-gear is shown at 55, and it constitutes a connection between the weighing mechanism and indicating mechanism and also constitutes a driving element for operating at times the pinion 56, fixed to the rear end of the index-arbor 43. Said sector-gear, as shown by full lines in Fig. 6, is normally out of mesh with the coöperating pinion or driven element 56, but is thrown into working relation therewith by the action of coin-controlled mechanism, thereby to effect the rotation of the arbor or shaft 43, and consequently the pointer 51 thereon, to secure a registration of the weight of a person upon the platform P, which platform is operatively connected with the sector by means involving a longitudinally yieldable or extensible connection. The shank 57 of the sector has a lateral hub or sleeve 58, which receives the pivot 59 at the upper end of the rocker 61, (see Figs. 6 and 9,) said rocker being pivoted, as at 61', to the back plate of the head.

In Fig. 6 the parts are shown as occupying their primary positions by full lines. By the insertion of a coin, however, through the usual slot said coin sets in motion proper mechanism for throwing the sector into mesh with the coöperating pinion 56, the rocker 60 upon such motion of the sector being swung to what is represented as the left. When the test is concluded, the coin will be discharged automatically and the sector-gear will be thereafter returned to its initial position.

The upper end of the rocker 60 (see Fig. 9) is notched, as at 62, to receive the short link 63, through which the pivot 59 freely passes, what is shown as the right-hand end of the link being hooked, as at 64, (see Fig. 12,) to engage over the eccentric or crank portion 65 of the rock-shaft 66, suitably supported within the head of the machine. A coin receptacle or cup is connected to this rock-shaft, and the latter is provided with a counterweight, as 67, connected thereto by the arm 68, the purpose of the counterweight being to return the coin receptacle or cup from its shifted to its normal position. The weighing coin-cup is denoted by 69, and it consists of two properly-separated side plates, the bottom of which is formed by a bend 70 at the free end of the longitudinal carrier or arm 71, secured at its opposite end to the rock-shaft 66.

Although the coin-receptacle and its carrier should not properly appear in Fig. 6, I have deemed it necessary to successfully show the action of the parts to represent it therein, together with the coin-chute 72, leading into the coin-receptacle.

When in its primary position, the side walls or plates of the coin-receptacle are adapted to overlap the discharge end of the coin chute or runway 72, the upper aperture of which is located in position to receive a coin of the proper denomination at a point outside the case. The coin is introduced in the usual manner and rolls down the conduit or runway 72 into the receptacle or cup 69, and its weight serves to depress the receptacle from its full-line to its dotted-line position, thereby throwing the sector 55 into mesh with the coöperating pinion 56 upon the arbor 43. As the arm or carrier 71 is depressed it turns the shaft 66 in the direction of the arrow in Fig. 12, so that the link 63 is thrust to what is represented as the left, thereby correspondingly moving the rocker 60 to secure a working engagement between the sector 55 and the pinion 56, and during this motion the sector 55 will pass clear of a latch controlling the same, whereby said sector can be operated.

The longitudinally-yieldable connection uniting the sector and the cross-head 27, which, it will be remembered, is connected to the beam mechanism, is denoted in a general way by C, and it is shown including in its organization a spring and means for tensioning the same, the spring being very much lighter than the counterbalance-springs 30, but being compressible in correspondence therewith.

The connector C is shown having two rods 75 75, each mounted for longitudinal movement relatively to the other. The lower rod 76 is shown connected by a turnbuckle 77 with the cross-head 27, and by turning the nut on said turnbuckle the tension of the spring acting against the two rods can be properly regulated. The upper end of the connector or the rod 75 thereof is shown connected to the slide-block 78, movable in the direction of the length of the shank 57 of the sector 55 and having an offset 79 adapted to receive the adjusting-screw 80, sustained by the fixed bearing 81 upon said shank, so that by turning the adjusting-screw the upper end of the connector can be moved toward or from the center of motion of the sector to regulate the throw thereof and thereby secure a correct adjustment of the pointer, as will hereinafter be evident.

The rods 75 and 76 are shown as flat, and they are disposed face to face and are connected by means of blocks or cylinders 82 and 83, notched longitudinally to receive them, and they are surrounded by the coiled spring 84, which bears against the heads or flanges 85 and 86 of the respective blocks or cylinders, said heads in turn being adapted to engage the offsets or projections 87 and 88 at the free ends of the rods.

The coiled spring 84, as will hereinafter appear, is oppositely compressible, and as it opens the heads of the cylinders against which it acts are adapted, respectively, to act against the stops 89 and 90 upon the two rods, so that the return of the spring to its initial condition is assured.

Means are provided for normally locking the driving element in its inoperative position, and for this purpose the sector 55 has, near the forward end thereof, substantially intermediate its extremities, the projection 91, adapted to be engaged by the hooked arm of the gravity detent or latch 92, pivotally supported within the case. The construction in the present case is such that at the proper point in the forward movement of the sector the projection 91 will pass free of the working arm of the latch, and the sector being in mesh with the pinion 56 can rotate said pinion as it is drawn down, as will hereinafter appear, the distance traveled by the sector and the other parts governed thereby varying, of course, with the weight applied to the platform. A bearing is shown at 93, and it receives the adjusting-screw 94, engaging the hooked arm of the gravity-latch 92, so as to adjust said latch with respect to the sector for the purpose of securing the release of the latter at the exact time.

The operation of weighing a person or object upon the platform is as follows: The person will first stand upon said platform, which action through the beam mechanism and the intermediate parts serves to draw down the rod 24 and also the cross-head 27, so that the cross-head by pulling upon the counterbalance-springs 30 can extend or stretch them a distance corresponding to the weight upon the platform, and during this period the lower rod 76 of the connector will be drawn down in unison therewith, the sector 55 being, it will be understood, locked against motion by the latch 92. As the rod 76 is drawn down, the upper rod 75 being stationary, the offset or projection 88 by pressing against the head 85 of the cylinder 82 will force said cylinder downward, thereby compressing the spring against the lower cylinder and projection 87, the compression corresponding with the weight of the person to be weighed, so that subsequently when the sector is released the compressed spring can serve to draw said sector downward a distance equal to the weight of the person or object upon the platform. The extension of the counterbalance-springs 30 and the compression of the sector-actuating spring 84 occur before the insertion of a coin and are instantaneous. In Fig. 15 I have shown the coiled spring 84 compressed to its maximum extent, and when thus compressed it will be evident that when released said spring serves to operate the sector the full length of its stroke, this being for the purpose of obtaining the extreme indication by the indicating mechanism. The coin introduced through the usual coin-aperture passes down the chute 72 and falls into the cup or carrier 69, causing the same to gravitate by the excess weight from its full to its dotted line position, Fig. 6, the coin being preferably held in the cup by a detent until the weight is removed from the platform. As the cup moves downward and turns the rock-shaft 66 in the direction of the arrow (see Fig. 12) the eccentric 65 thereof throws the link 63 to the left in Fig. 12, and thereby moves the sector 55 forward into engagement with the pinion 56. This forward motion of the sector carries the projection 91 thereon out of engagement with the working arm of the latch 92 and releases said sector, and when it is free to move the compressed coiled spring 84 will turn the sector about its axis, thereby rotating the pinion 56, the arbor 43, and the pointer 51, whereby a record of the weight can be seen upon the dial.

The spring 84, in addition to serving as a primary actuating device for the sector 55, also acts as a cushion or buffer to receive the shock or jar which takes place when the very strong coiled springs 30 are released, the cross-head 27 during this action being given an upward thrust by the rod 24, which in turn is transmitted to the rod 76 and is taken up by said spring, so that none of the mechanism can be injured; but the spring instead of being compressed downwardly, as previously, is pressed in an upward direction. The cross-head 27 also moves downward and upward when the lifting and gripping tests are made, and in both of these the spring 84 serves to take up the shock of the returning cross-head.

To secure an even regular motion of the arbor 43, I provide in conjunction therewith a fan-governor of suitable kind, shown as including the blades 100 and 101, supported at opposite sides of the arbor by means of the arms 102 and 103, and I provide in connection with the coin-carrier 69 a detent, the purpose of which is to hold the coin therein until after the weighing test has been made, and this detent may be of any suitable character, and it is automatically operated in the present case by means governed by the testing mechanism and as soon as the platform P is relieved of its weight.

The detent is denoted by D, (see Fig. 6,) and it has a central pivot 104 supported for rocking movement by the offset 105 depending from the coin-carrier. The arms 106 and 107 extend oppositely from the rocking pivot or central portion 104 and constitute part of the detent. The upper arm 106 is the effective one, and its free end has a hook 207 projecting normally through alined openings, as 108, near the forward corner of the coin-cup, said hook serving as a stop for the coin to hold it between the walls of side plates of the coin-carrier. When said hook or stop is moved out of the path of the coin, the latter can fall from the coin-cup into a chute, as S, supported within the hollow column of the framing and surrounded at its lower end by a coin-bag, as 109.

The trip device for the detent D may be of any suitable character. That represented is denoted in a general way by T, and it serves also as a means for effecting automatically the discharge of a coin from the coin-cup that coöperates with the lifting and gripping instrumentalities.

The trip device illustrated consists of a shaft 110 supported for oscillation within the case and having the trip members or arms 112 and 113 slightly deflected at their upper ends, as shown in Figs. 5 and 10. The trip-arm 112 coöperates with one coin-detent, while the arm 113 coöperates with the other detent, hereinafter described, but similar in construction to that previously set forth.

The detent D is held in its working position by means of the leaf-spring 114, bent around the lower end of and secured to the offset 105, the free end of said spring acting against the square portion 115 of the pivot 104, as shown in Fig. 19. The trip member 112 is normally disposed in the path of the arm 107 of the detent D, and said trip member is movable out of its normal position when a weight is placed upon the platform P. Should a coin, however, be inserted in the cup 69 without a person having first stepped upon the platform, said cup will be depressed, and as it moves downward the arm 107 will strike the upper end of the tripping-arm 112, so as move the hook 108 out of the path of the coin, so that the latter can be discharged into the chute S.

The trip device T is in the nature of a gravitative member, it falling away from its position shown in dotted lines in Fig. 10 to that shown in full lines in said figure when the platform is depressed, so that a test can be made without discharging the penny. When, however, the force is taken off from the platform, the trip device will be automatically returned to its initial position, and as it does so the arm 112 thereof will strike the tailpiece 107 of the detent, so as to effect the discharge of the coin. The threaded portion 25 of the connecting-rod 24 is embraced by the nut 120, having a projection 121 adapted to engage the laterally-extending arm 122 upon the squared rock-shaft 110, so as to normally hold the trip device in its initial position, as indicated by dotted lines in Fig. 10. When, however, the rod 24 descends, the projection 121 will fall away from the coöperating arm 122, allowing the tripping-arms 112 and 113 to move away from the coöperating detents, thereby to secure a test. When the rod 24 ascends, the action described will be reversed, so that one of the two tripping-arms can strike its coöperating detent to trip the same and release a coin. The nut 120 is adjustable, so as to regulate the position of the trip device, and it is held fixed by the check-nut 123, located below the same.

The action of the tripper T is limited by a suitable device, as the stop 197, shown as a nut upon the threaded end 198 of the bolt 195, which is tapped into the head of the machine in front of the tripper-arms 112 and 113, as shown in Fig. 10.

The lifting mechanism in the present case embodies a relatively stationary member adapted to be grasped by a person standing upon the platform, so as to depress the latter and indicate upon the dial the force expended, and it includes a handle 130, extending transversely from the upper end of the screw 131, the whole being substantially of T shape. This screw is threaded through the hub 132 at the end of the bracket 133, supported for swinging movement by the framing of the apparatus, so as to secure the angular adjustment of said bracket. The vertical adjustment of the screw 131 is secured simply by turning the same in its bearing or hub 132.

The lifting appliance therefor is stationary relative to the platform.

In making a lifting test a person will first stand upon the platform P and mechanism will be set in operation to obtain the weight of such person, but without indicating the fact. Prior to the actual lifting operation, however, a coin will be inserted in the proper slot to render the indicating mechanism effective, and by pulling upward upon the handle 130 the platform will be further depressed, so that the pointer 51 will be turned to indicate the lifting force in pounds. The cross-bar 41 in the forward side of the head 23 supports the rock-shaft 135, having a counterweight 136, connected thereto by the arm 137, the coin-cup carrier or arm 138 being connected to the forward side of the shaft. The coin-cup at the end of said arm 138 is denoted by 69'. The detent D' is coöperative with the coin-cup 69', and these parts are of the same construction as those previously specified, and hence I shall denote corresponding parts by similar characters with prime-marks. The shaft 135 is rocked, through the weight of a coin, to throw the lifting or grip-indicating instrumentalities into action, said coin being received through the chute 72' and being delivered into the chute S', where it passes into the bag 109'. The shaft 135 has an eccentric or crank portion 140, embraced by the hook 141, at the end of the link 142, said link being pivoted at its opposite end to the rocker 143, pivoted, as at 144, to the framing. The pivot 145, that unites the link 142 to the rocker, also passes through the segment 146, which constitutes a connection between the lifting and gripping mechanism and indicating mechanism and is connected near its forward side intermediate its extremities to the rod 147, extending downward therefrom. The rod 147 has the collar 148, adapted to be engaged by the pin 149, extending laterally from the collar 150 upon the rod 24, said pin having an opening to receive said rod 147. The insertion of a coin into the cup 69' causes the gravitation of said cup, thereby rocking the shaft 135 in the direction of the arrow, Fig. 11. The sector 146 and pinion 149, it will be understood, therefore are coupled or connected by the action of coin-controlled means, thus establishing an operative relation between the lifting mechanism and indicating mechanism.

To determine the lifting power, a person will first stand upon the platform. This will draw the rod 24, the rod 147, and sector 146 downward; but as the sector is not in mesh with the pinion 149 no registration will be made, but the springs 30 will be stretched sufficiently to compensate for the weight of the person. Afterward a coin will be inserted in the chute 72', passing from this into the cup 69', thereby through the intermediate parts throwing the sector into mesh with the pinion. When the two parts are in mesh, the testing and indicating mechanisms will be in operative connection, so that by pulling up on the handle 130 the platform will be further depressed, and consequently through the agency of the intermediate parts securing the desired test and indication thereof on the dial. When the force is removed from the platform, the rod 24 will be thrust upward by the springs 30.

For the purpose of returning the rod 147 and the sector to the normal positions thereof I have represented a coiled spring 155, connected to the collar 148 and also to the framing, said spring being extended during the lifting test, and as it contracts it serves to thrust the rod and sector upward.

The coin-cup 69' is returned to its normal position opposite the chute 72' by the counterweight 136.

The gripping device also operates in conjunction with the sector 146; but the gripping and lifting operations, it will be obvious, are controlled by independent coins.

A finger-grip is shown at 160 upon the outside of the case, it being adapted to coöperate with the movable handle 161, the corrugated inner portion of the substantially T-shaped portion 160 being adapted to receive the fingers, while the palm or hollow of the hand fits against the outer part of the handle in making a grip test. The handle 161 is substantially of U shape, one of its branches extending entirely through the column, while the other one extends about half-way through. The two branches are united by the cross-bar 162 in the case and suitably secured to said branches and to which the link 163 is jointed, said link being likewise united to the normally vertical arm of an angle-lever 164, fulcrumed within the framing. To the horizontal part of the angle-lever the rod 165 is secured and also to the beam-lever 166, constituting a part of the beam mechanism housed by the base-piece 20.

In making the grip test the person will first stand upon the platform and depress the same, and his weight will be compensated for by the stretching of the spring 30; but this fact will not be shown, as the testing and indicating mechanisms are not at this time in coöperative relation. Upon the insertion of a coin, however, into the chute 72' it will pass into the cup 69', whereby the sector 146 will be thrown into mesh with the coöperating pinion 149. With the parts in this position when a person operates the handle 161 to secure the grip test the pushing in of said handle will through the cross-head 162 and link 163 turn the elbow-lever 164 about its pivot, thus raising the horizontal arm thereof and through the rod 165 operating to pull down the rod 24. This additional downward movement of rod 24 is communicated to the rod 147, connected to the sector 146, through the collar 150 and arm 149, and thus the grip test is indicated. The grip and lifting mechanisms therefore both operate through the sector 146, which is given a primary movement upon the application of a weight to the platform P without indicating the weight exerted, and it is given a second movement upon the insertion of a coin to indicate either the lifting or gripping force; but these lifting and gripping operations can be effected only by means of two coins, although said coins pass into a common chute and operate certain parts common to both mechanisms.

The longitudinal coiled spring 175 is connected to the relatively horizontal arm of the angle-lever 164 and also to the hook 176 in the casing, the purpose of the spring being to return the angle-lever, the handle 161, and the parts operative therewith to their initial positions after the grip test has been concluded.

It is desirable to prevent back motion of the arbor when making a lifting or grip test, as the pull or pressure sometimes is variable. The arbor is equipped at a suitable place with the ratchet 180, with which the gravity-pawl 181 coöperates, said pawl being pivotally connected at 182 to the cross-bar 41. The gravity-pawl is controlled by the pivot 145, against which the tail of the pawl 181 normally rests, as indicated in Fig. 5. On the initial movement of the sector 146 it swings about the pivot 145. On the second movement of the sector when it is thrown into mesh with its coöperating pinion 149 the rocker 143 will be swung from its oblique position toward the perpendicular, and as it does so the extended end of the pivot-pin 145 will pass to a point above the notch 145″ in the upper side of the gravity-pawl 181, so that the hook or working end of said pawl can fall into engagement with the ratchet 180, which turns with the arbor 43. As soon as the pawl is in engagement with the ratchet, and this takes place when the sector and pinion are in mesh, back motion of the arbor is positively prevented. Upon the reverse rotation of the ratchet the pawl will click idly over the teeth of the same, and the working end of the pawl will be lifted out of engagement with the ratchet by the pivot-pin 145 as the sector nears its initial position.

It will be understood that when the coins are discharged the two driving elements 55 and 146, controlling the driven elements 56 and 149 upon the arbor 43, will be thrown out of mesh therewith, and therefore I provide means to return the arbor to its initial position and with the pointer 51 upon said arbor opposite the zero-mark upon the dial, said means being active independently of the two driving members.

The cross-bar 41 sustains for oscillation the segment 190, meshing with the pinion 191 upon the arbor 43, and the hub of said segment has a projection 192, shown as a screw, coöperating with the stop 193 upon the ratchet 180.

In making a test the sector 190 through the agency of the pinion 191 will be rotated in the direction of the arrow in Fig. 5 and the projection 192 will be moved away from the stop 193, against which it normally abuts. Said sector 190 is weighted, as at 195, near its periphery, the increased weight constituting a convenient means to return said segment to its normal position shown in said figure. As the segment is moved in the direction of the arrow the projection 192 will pass off the stop 193. When the arbor 43, however, is released, the weighted portion 195 of the segment will fall and the same will move in a direction opposite to the arrow, thereby oppositely rotating the arbor 43, and consequently returning the pointer 51 from its shifted to its place opposite the zero-mark on the dial, at which time the projection 192 will strike the stop 193 upon the ratchet. By manipulating the screw projection 192 a slight and necessary adjustment of the same can be obtained to secure the accurate stoppage of the pointer.

The invention is in no wise limited to the construction and arrangement of parts previously set forth, for these may be materially modified within the scope of the appended claims.

Having described my invention, what I claim as new, and desire to secure by Letters Patent, is—

1. In a coin-controlled apparatus testing and indicating mechanisms, a normally inoperative connection between the same, devices acting to positively hold said connection inoperative, and coin-controlled mechanism to release said devices and render said connection operative.

2. In a coin-controlled apparatus, testing and indicating mechanisms normally in inoperative relation, locking means to preserve the inoperative relation, and coin-controlled means for releasing the locking means and establishing an operative connection between said mechanisms.

3. In a coin-controlled apparatus, testing and indicating mechanisms, a normally locked connecting member operatively connected to the testing mechanism and in inoperative relation with the indicating mechanism, and coin-controlled means for releasing said connecting member and establishing an operative relation between the same and the indicating mechanism.

4. In a coin-controlled apparatus, testing mechanism, a normally locked driving member connected thereto, indicating mechanism including a driven member operable by said driving member and normally in inoperative relation therewith, and coin-controlled means for releasing the driving member and effecting the operative engagement of the driving and driven members.

5. In a coin-controlled apparatus, testing mechanism, a gear connected thereto, indicating mechanism also including a gear normally out of mesh with said first-mentioned gear, means to normally lock said first-mentioned gear against movement, and coin-controlled means for releasing said locked gear and throwing one of the gears into mesh with the other.

6. In a coin-controlled apparatus, testing and indicating mechanisms normally in inoperative relation, locking means to preserve such inoperative relation, a coin-controlled shaft having an eccentric portion, and means operated by said shaft for establishing an operative relation between said mechanisms.

7. In a coin-controlled apparatus, testing mechanism, a normally locked driving member connected thereto, indicating mechanism including a driven member normally out of engagement with said driving member, a shaft having an eccentric, a link connected respectively to the eccentric and with the driving member, and coin-controlled means for operating said shaft, whereby the driving member is released and thrown into engagement with the driven member.

8. In a coin-controlled apparatus including a driving member, indicating mechanism including a driven member, a rocker to which said driving member is connected, a shaft having an eccentric portion connected to the rocker, and a coin-operated member connected to the shaft, whereby the turning of the shaft by a coin throws the driving and driven members into engagement.

9. In a coin-controlled apparatus, testing mechanism, a gear connected thereto, indicating mechanism including an arbor provided with a pinion normally out of mesh with said gear, a rocker to which the gear is connected, a link jointed to the rocker and provided with a hook, a rock-shaft having an eccentric portion adapted to receive said hook, and a coin-receptacle connected to said shaft.

10. In a coin-controlled apparatus, testing and indicating mechanisms, a normally inoperative connection between the same, locking means for preserving the connection in its inoperative position, and a coin-receptacle operable by the weight of a coin, devices operated thereby and serving to release the locking means and render said connection operative.

11. In a coin-controlled apparatus, testing and indicating mechanisms normally in inoperative relation, locking means to normally preserve such inoperative relation, coin-controlled means for releasing the locking means and establishing an operative relation between said mechanisms, and means acting independently of the coin-controlled means for returning the indicating mechanism to its primary position.

12. In a coin-controlled apparatus, testing and indicating mechanisms normally in inoperative relation, the indicating mechanism including a shaft provided with a gear, coin-controlled means for throwing one of said mechanisms into operative relation with the other, a gear meshing with the first-mentioned gear and provided with a projection, a stop located to be engaged by said projection and when the indicating mechanism is in its primary position, and means for operating said second-mentioned gear.

13. In a coin-controlled apparatus, testing and indicating mechanisms normally in inoperative relation, the indicating mechanism including a shaft provided with a gear, coin-controlled means for throwing one of said mechanisms into operative relation with the other, a weighted gear meshing with the first-mentioned gear and provided with a projection, and a stop disposed in the path of said projection.

14. In a coin-controlled apparatus, testing mechanism, a driving member connected thereto, indicating mechanism including a driven member operable by said driving member and normally in inoperative relation therewith, a shaft having an eccentric portion, a rocker pivotally supporting said driving member, a link connected to the pivot that unites the rocker and the driving member and having a hook at one end fitted over said eccentric portion, and a coin-receptacle having an arm connected to said shaft.

15. In a coin-controlled apparatus, testing and indicating mechanisms normally in inoperative relation, locking means to normally preserve such inoperative relation, coin-controlled means including a coin-receptacle for releasing said locking means and establishing an operative relation between said mechanisms, and means governed by one of said mechanisms for effecting the discharge of a coin from said receptacle.

16. In a coin-controlled apparatus, testing and indicating mechanisms normally in inoperative relation, one of said mechanisms having connected thereto a normally locked member, coin-controlled means for unlocking the locked member and for throwing the testing mechanism into operative relation with the indicating mechanism, and means controlled by said testing mechanism for effecting the discharge of a coin after a test.

17. In a coin-controlled apparatus, testing mechanism, two independent driving members connected thereto, indicating mechanism including a driven member operable by either of said driving members and normally in inoperative relation with each of them, and coin-controlled means for effecting the operative engagement of either of said driving members with the driven member.

18. In a coin-controlled apparatus, a testing mechanism, two independent driving members connected thereto, indicating mechanism including a driven member operable by either of said driving members, and normally in inoperative relation with each of them, locking means to normally preserve the inoperative relation between one of said driving members and the driven member, and coin-controlled means for effecting the operative engagement of either of said driving members with the driven member.

19. In a coin-controlled apparatus, testing and indicating mechanisms, a normally locked driving element connected to one of said mechanisms and normally in inoperative relation with the other, coin-controlled means for releasing said driving element and establishing an operative connection between said testing and indicating mechanisms, said coin-controlled means including a coin-receptacle and a coin-detent serving to hold a coin in said receptacle, and means to trip the detent.

20. In a coin-controlled apparatus, an actuated member normally inoperative, a movable coin-receptacle, a coin-detent serving to hold a coin in said receptacle, means controlled by the movement of said coin-receptacle for rendering said actuated member operative, a gravitative trip device normally disposed in the path of the detent and operated by the action of said coin-receptacle.

21. In a coin-controlled apparatus an actuated member normally inoperative, actuating mechanism therefor, a movable coin-receptacle, a coin-detent serving to hold a coin in said receptacle, means controlled by the movement of said coin-receptacle for rendering said actuated member inoperative, and a gravitative trip device normally disposed in the path of the detent, and controlled by the actuating mechanism.

22. In a coin-controlled apparatus, a coin-receptacle, testing mechanism, a detent serving to hold a coin in said receptacle, a gravitative trip device for and arranged in the path of the coin-detent to engage the latter, and means coöperative with the testing mechanism to hold said trip device in its normal position.

23. In a coin-controlled apparatus, testing mechanism having two shiftable elements, and a connector uniting said shiftable elements and consisting of two members each shiftable relative to the other, a spring active against both of said members, means to normally hold one of said members inactive, and coin-controlled mechanism to release said means.

24. In a coin-controlled apparatus, a connector including two members each shiftable in the direction of the length of the other, means uniting said members, a yieldable part acting against both of them, means to normally hold one of said members inactive, and coin-controlled means to render said member active.

25. In a coin-controlled apparatus, testing mechanism and indicating mechanism and a connector between the same including two members each shiftable in the direction of the length of the other, two slide-blocks engaging and connecting said members, and a coiled spring surrounding said members and acting against the blocks.

26. In a coin-controlled apparatus, a connector including two rods each shiftable in the direction of the length of the other, two blocks notched to receive said members, and a coiled spring bearing against the blocks.

27. In a coin-controlled apparatus, indicating mechanism including a driven member, testing mechanism, a driving member normally out of operative relation with the driven member and a longitudinally-yieldable connection uniting said driving member and testing mechanism, and coin-controlled means for shifting the driving member into working engagement with the driven member.

28. In a coin-controlled apparatus, indicating mechanism including a shaft carrying a driven member, beam mechanism, a platform sustained by the beam mechanism, a rod coöperative with the beam mechanism, a driving member yieldably connected to said rod, and coin-controlled means for governing the action of said driving member.

29. In a coin-controlled apparatus, indicating mechanism including a driven member, testing mechanism, a driving member yieldably connected thereto and normally in inoperative relation with said driven member, and coin-controlled means governing the action of said driving member.

30. In a coin-controlled apparatus, indicating mechanism, testing mechanism, a normally inoperative connection between said mechanisms and yieldably connected to one of them, and coin-controlled means for rendering said connection operative.

31. In a coin-controlled apparatus, indicating mechanism, testing mechanism having a normally locked driving member yieldably connected thereto and normally in inoperative relation with the indicating mechanism, and coin-controlled means for releasing said driving member and throwing it into operative relation with the indicating mechanism.

32. In a coin-controlled apparatus, indicating mechanism, testing mechanism, a driving member normally in inoperative relation with the indicating mechanism, a longitudinally-yieldable connection uniting said driving member and testing mechanism, sadi connection comprising two members, each shiftable in the direction of the length of the other, means uniting said members, and a yieldable part acting against both of them, and coin-controlled means for establishing an operative relation between the driving member and indicating mechanism.

33. In a coin-controlled apparatus, indicating mechanism, testing mechanism, a driving member normally in inoperative relation with the indicating mechanism, a longitudinally-yieldable connector uniting said driving member and testing mechanism, said connector consisting of two members each shiftable relative to the other, and a spring acting against both of said members, and coin-controlled means to establish an operative relation between the driving member and indicating mechanism.

34. In a coin-controlled apparatus, indicating mechanism, testing mechanism, a driving member normally in inoperative relation with the indicating mechanism, a longitudinally-yieldable connector uniting said driving member and testing mechanism, said connector comprising two members, each shiftable in the direction of the length of the other, two slide-blocks connecting said members, and a coiled spring surrounding said members and acting against the blocks, and coin-controlled means to establish an operative relation between the driving member and the indicating mechanism.

35. In a coin-controlled apparatus, indicating mechanism, testing mechanism, a driving member normally in inoperative relation with the indicating mechanism, a longitudinally-yieldable connector uniting the driving member and the testing mechanism, said connector including two rods each shiftable in the direction of the length of the other, two blocks notched to receive said members, and a coiled spring bearing against the blocks, and coin-controlled means to establish an operative relation between the driving member and the indicating mechanism.

36. In a coin-controlled apparatus, indicating mechanism, testing mechanism, a normally locked driving member in inoperative relation with said indicating mechanism, a longitudinally-yieldable connector uniting said driving member and testing mechanism, and coin-controlled means for shifting the driving member into working engagement with the driven member, said connector comprising two members each shiftable in the direction of the length of the other, means uniting said members and a yieldable part acting against both of them, and coin-controlled means to release said driving member and establish the operative relation between the same and the indicating mechanism.

37. In a coin-controlled apparatus, indicating mechanism, testing mechanism, a normally locked driving member normally in inoperative relation with the indicating mechanism, a longitudinally-yieldable connector uniting the testing mechanism and driving member, said connector including two members, each shiftable in the direction of the length of the other, two slide-blocks connecting said members, and a coiled spring surrounding said members and acting against the blocks, and coin-controlled means for releasing the driving member and establishing operative relation between the same and the indicating mechanism.

38. In a coin-controlled apparatus, testing mechanism, a gear yieldably connected thereto, indicating mechanism also including a gear normally out of mesh with said first-mentioned gear, and coin-controlled means for throwing one of the gears into mesh with the other.

39. In a coin-controlled apparatus, testing mechanism, a gear yieldably connected thereto, indicating mechanism also including a gear normally out of mesh with said first-mentioned gear, means to normally lock said first-mentioned gear against movement, and coin-controlled means for releasing said locked gear and throwing the same into mesh with the other gear.

40. In a coin-controlled apparatus, testing mechanism, a driving member yieldably connected thereto, indicating mechanism including a driven member normally out of engagement with the said driving member, a shaft having an eccentric, a link connected respectively to the eccentric and with the driving member, and coin-controlled means for operating said shaft, whereby the driving member is thrown into engagement with the driven member.

41. In a coin-controlled apparatus, testing mechanism, a gear yieldably connected thereto, indicating mechanism including an arbor provided with a pinion normally out of mesh with said gear, a rocker to which said gear is connected, a link jointed to the rocker and provided with a hook, a rock-shaft having an eccentric portion adapted to receive said hook, and a coin-receptacle connected to said shaft.

42. In a coin-controlled apparatus, testing mechanism, a driving member connected thereto, indicating mechanism including a driven member operable by said driving member and normally in inoperative relation therewith, a latch for holding said driving member in its ineffective position, and coin-controlled means for effecting the release of said driving member and for moving the same into working engagement with the driven member.

43. In a coin-controlled apparatus, testing mechanism including means for obtaining different kinds of tests, indicating mechanism, coin-controlled means for throwing the indicating mechanism into operative relation with the testing mechanism, including independently-active receptacles, and instrumentalities governed by the testing mechanism for effecting the discharge of the coins.

44. In a coin-controlled apparatus, indicating mechanism including a driven member, testing mechanism, a driving member connected thereto and normally out of operative relation with the driven member and movable without effecting the action of the driven member, means controlled by a coin for throwing the driving member into working relation with the driven member thereby to actuate the latter, and means controlled by the coin-controlled mechanism for preventing back motion of the indicating mechanism.

45. In a coin-controlled apparatus, indicating mechanism including a shaft provided with a driven gear, testing mechanism, a driving-gear connected thereto and movable independently of the driven gear upon a partial test, and coin-controlled means operable to throw the driving-gear into mesh with the driven gear to complete the test.

46. In a coin-controlled apparatus, indicating mechanism including a shaft provided with a driven gear, testing mechanism, a driving-gear connected thereto and movable independently of the driven gear upon a partial test, coin-controlled means operable to throw the driving-gear into mesh with the driven gear to complete the test, a ratchet coöperative with said shaft, and a pawl for the ratchet controlled by the driving-gear.

47. In a coin-controlled apparatus, beam mechanism, a platform mounted upon the beam mechanism, counterbalancing means connected with the beam mechanism, indicating means having a driven member, two driving members independently operative, means for throwing either of the driving members into operative relation with the driven member, said means being controlled by a coin, and lifting and gripping members coöperative with one of said driving members.

48. In a coin-controlled apparatus, indicating mechanism provided with a driven element, testing mechanism, a plurality of independent driving elements connected thereto, each of said driving elements being normally in inoperative relation with the driven element, a plurality of independent coin-controlled mechanisms for separately throwing the driving elements into engagement with the driven elements.

49. In a coin-controlled apparatus, indicating mechanism, testing mechanism, two independent driving elements connected thereto, each normally in inoperative relation with the indicating mechanism, locking means for one of said driving elements, and two independent coin-controlled mechanisms for throwing the driving elements into engagement with the indicating mechanism.

50. In a coin-controlled apparatus, beam mechanism, counterbalancing means connected with the beam mechanism, indicating means, two driving members independently operative, and each connected with the beam mechanism, one of said members having a yielding connection therewith, means to normally lock said last-mentioned driving member against movement, means for throwing either of the driving members into operative relation with the indicating mechanism, said means being controlled by a coin, and lifting and gripping members coöperative with one of said driving members.

51. In a coin-controlled apparatus, indicating mechanism, beam mechanism, a driving member yieldably connected to said beam mechanism, means normally locking said driving member in inoperative relation to said indicating mechanism, and coin-controlled means for releasing said driving member, and throwing it into engagement with the indicating mechanism, whereby the yieldable connection operates to give motion to the driving member and thus operate the indicating mechanism.

In testimony whereof I have signed my name to this specification in the presence of two subscribing witnesses.

HENRY H. CUMMINGS.

Witnesses:
  HEATH SUTHERLAND,
  LOUISE ROTHSTEIN.